(12) United States Patent
Zuo et al.

(10) Patent No.: US 6,770,733 B2
(45) Date of Patent: Aug. 3, 2004

(54) POLYIMIDE COPOLYMER

(75) Inventors: Min Zuo, Kitaibaraki (JP); Jenq-Tain Lin, Kitaibaraki (JP)

(73) Assignee: Nippon Mektron, Limited, Tokyo (JP)

( * ) Notice: Subject to any disclaimer, the term of this patent is extended or adjusted under 35 U.S.C. 154(b) by 12 days.

(21) Appl. No.: 10/336,343

(22) Filed: Jan. 3, 2003

(65) Prior Publication Data

US 2003/0187179 A1 Oct. 2, 2003

(30) Foreign Application Priority Data

Mar. 27, 2002 (JP) ........................................ 2002-088089

(51) Int. Cl.[7] ........................ C08G 73/10; B32B 27/00; B29D 4/00
(52) U.S. Cl. ........................ 528/353; 528/125; 528/126; 528/128; 528/170; 528/172; 528/173; 528/176; 528/179; 528/183; 528/188; 528/220; 528/228; 528/229; 528/350; 528/351; 428/457; 428/458; 428/473.5; 264/212; 264/299
(58) Field of Search .................. 528/125, 126, 528/128, 170, 172, 173, 179, 183, 185, 188, 220, 229, 350, 353, 176, 351; 428/473.5, 458, 457; 264/212, 299

(56) References Cited

U.S. PATENT DOCUMENTS 3,247,165 A    4/1966  Rodia ......................... 528/226
6,133,408 A  * 10/2000  Chiu et al. .................... 528/353
6,217,996 B1 *  4/2001  Yamamoto et al. .......... 428/220
6,245,484 B1 *  6/2001  Chiang et al. ............. 430/281.1
6,489,436 B1 * 12/2002  Lin et al. ..................... 528/353
6,582,885 B2 *  6/2003  Chiang et al. ............ 430/281.1
2003/0187179 A1 * 10/2003  Zou et al. .................... 528/170

FOREIGN PATENT DOCUMENTS

EP        0 354 360 A     2/1990
WO        WO 01/29136     4/2001

OTHER PUBLICATIONS

XP000824681 "Caustic Etchable Polyimide Films Containing 2– (4–Aminophenyl)–5–Aminobenzimidazole As A Monomer Component" Research Disclosure, Kenneth Mason Publications, Hampshire, GB, No. 409, May 1998, p. 544 ISSN: 0374–4353.

* cited by examiner

Primary Examiner—P. Hampton Hightower
(74) Attorney, Agent, or Firm—Butzel Long

(57) ABSTRACT

A film-formable polyimide copolymer, which comprises two kinds of tetracarboxylic acid dianhydride consisting of (A) pyromellitic acid dianhydride and (B) 3,3',4,4'-benzophenonetetracarboxylic acid dianhydride, and (C) 6-amino-2-(p-aminophenyl)benzimidazole has a heat-resistant dimensional stability without any deterioration of mechanical properties inherent in the polyimide resin when used as a film.

5 Claims, No Drawings

POLYIMIDE COPOLYMER

BACKGROUND OF THE INVENTION

1. Field of the Invention

The present invention relates to a novel polyimide copolymer, and more particularly a novel polyimide copolymer with a distinguished heat-resistant dimensional stability.

2. Related Art

It is known that available polyimide resins up to now have distinguished characteristics such as good heat resistance, electrical and mechanical properties, etc., but generally suffer from high coefficient of linear expansion, high coefficient of humidity expansion, and poor dimensional stability. Particularly, when the coefficient of linear expansion is not less than 30 ppm/° C., polyimide resins will have a poor heat-resistant dimensional stability, and thus have problems such as generation of warping or curling when applied to lamination with a metal foil to form a flexible wiring substrate, etc.

To solve these problems, polyimide films obtained, for example, from pyromellitic acid dianhydride and 6-amino-2-(p-aminophenyl)benzimidazole through polyamic acid have been proposed. They have a lower coefficient of linear expansion, but are very brittle, and thus are impractical for use as films.

A kind of polyimide copolymers based on 3,3',4,4'-benzophenonetetracarboxylic acid dianhydride-6-amino-2-(p-aminophenyl)benzimidazole has been already proposed by the present applicant (WO 01/29136), where isopropylidene bis(4-phenyleneoxy-4-phthalic acid)dianhydride is used together with 3,3',4,4'-benzophenonetetracarboxylic acid dianhydride, and polyimide copolymers per se obtained by polycondensation of these three components have a high adhesive strength and can produce a metal laminate having a satisfactory peel strength, even when bonded to a metal foil without any adhesive layer, and furthermore have a distinguished solder heat resistance, but fail to satisfy the desired heat-resistant dimensional stability.

SUMMARY OF THE INVENTION

An object of the present invention is to provide an aromatic tetracarboxylic acid dianhydride-6-amino-2-(p-aminophenyl)benzimidazole-based polyimide copolymer with a good heat-resistant dimensional stability without any deterioration of mechanical properties inherent in the polyimide resin itself when used as a film.

Such an object of the present invention can be attained by a novel film-formable polyimide copolymer, which comprises two kinds of tetracarboxylic acid dianlydrides, consisting of (A) pyromellitic acid dianhydride and (B) 3,3',4,4'-benzophenonetetracarboxylic acid dianhydride, and (C) 6-amino-2-(p-aminophenyl)benzimidazole.

DETAILED DESCRIPTION OF THE INVENTION

A mixture of (A) pyromellitic acid dianhydride (benzene-1,2,4,5-tetracarboxylic acid dianhydride) and (B) 3,3',4,4'-benzophenonetetracarboxylic acid dianhydride, as given by the following structural formula:

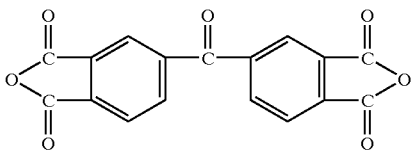

is used as tetracarboxylic dianhydride components for the present novel polyimide copolymer.

Components (A) and (B) are used in a proportion of Component (A) to Component (B) of about 5–about 90 mol. % to about 95–about 10 mol. %, preferably about 10–about 80 mol. % to about 90–about 20 mol. %, sum total being 100 mol. %. Below about 10 mol. % of Component (B), the film to be formed from the resulting copolymer will be more brittle, whereas above about 95 mol. % of Component (B) the content of Component (A) will be correspondingly decreased, so that no effective improvement of heat-resistant dimensional stability will be attained.

As a diamine capable of reacting with these two tetracarboxylic acid dianhydrides e.g. Component (C), 6-amino-2-(p-aminophenyl)benzimidazole, as given by the following structural formula:

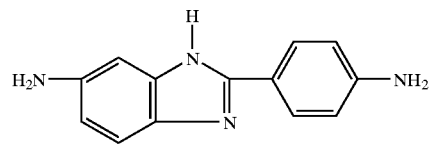

is used.

Reaction of tetracarboxylic acid dianhydrides with the diamine is carried out not only in an aprotic polar solvent such as dimethyl formamide, dimethyl acetamide, N-methyl-2-pyrrolidone, etc., but also in a polar solvent such as m-cresol. Practically, a polar solvent solution of diamine is dropwise added to a polar solvent solution of tetracarboxylic acid dianhydrides at a temperature of about 0°–about 30° C. with stirring, then to conduct reaction at about 0°–about 60° C. with stirring for about 0.5–about 5 hours after the dropwise addition. It seems that polyamic acid as a polyimide precursor copolymer can be formed thereby.

The resulting solution containing polyamic acid thus formed is cast onto a substrate such as a metallic foil, etc., and dried with hot air at about 60°–about 200° C., preferably about 80°–about 180° C., for about 5–about 100 minutes. Then, the resulting polyamic acid film is peeled away from the substrate and heated at about 150°–about 400° C., preferably about 200°–about 400° C. for 3 minutes to about 2 hours, thereby obtaining a polyimide copolymer film. Even by heating the polyamic acid film as laid on the metallic foil at a temperature capable of conducting polyimidization reaction without peeling the polyamic acid film away from the metallic foil, a polyimide copolymer laminated metallic foil can be directly obtained.

By reaction of (A) tracarboxylic acid dianhydride with (C) diamine, a polyimide copolymer having the following repeat unit can be obtained:

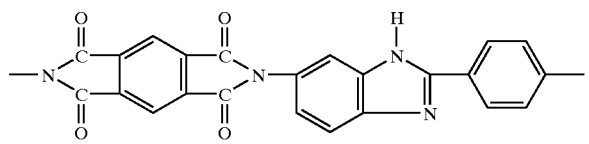

By reaction of (B) tracarboxylic acid dianhydride with (C) diamine, a polyimide copolymer having the following repeat unit can be obtained in addition to the aforementioned repeat unit:

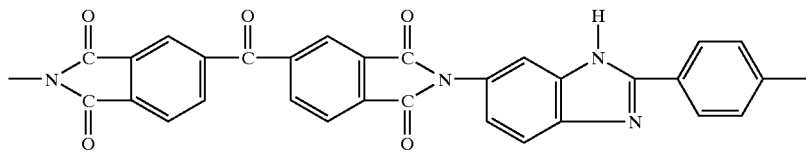

Polyimide copolymers having these repeat units are insoluble in so far available solvents and thus their molecular weights or viscosities cannot be determined or their ranges cannot be specified, but the polyimide copolymers must surely have film-formable molecular weights. At the stage of polyamic acid formation, where the polyimide precursor copolymer seems to be formed, it is possible to determine the viscosity of a reaction mixture solution having a given solid concentration, though the viscosity depends on reaction time, etc.

The present novel polyimide copolymer has a film formability and shows a distinguished heat-resistant dimensional stability without any deterioration of mechanical properties, etc. inherent to the polyimide resins per se, when used as films. The present polyimide copolymer films having these characteristics will not produce warping or curling when used in flexible wiring substrates, etc. requiring a higher dimensional stability, upon lamination with a metallic foil as a base film or a cover film.

PREFERRED EMBODIMENTS OF THE INVENTION

The present invention will be described below, referring to Examples.

EXAMPLE 1

A solution containing 2.18 g (0.01 mole) of (A) pyromellitic acid dianhydride, 29.00 g (0.09 moles) of (B) 3,3',4,4'-benzophenonetetracarboxylic acid dianhydride and 300 ml of N-methylpyrrolidone, was charged into a four-necked flask having a capacity of 1 liter provided with a stirrer in a nitrogen gas-replaced atmosphere, and then 22.43 g (0.1 mole) of (C) 6-amino-2-(p-aminophenyl)benzimidazole was charged thereto at a temperature of not higher than 30° C. The mixture was stirred at room temperature for 3 hours to obtain 353.6 g of polyimide precursor copolymer (polyamic acid) solution (solid concentration: 15 wt. %; viscosity at 20° C.: 7,020 cps).

The polyamic acid solution was cast onto a stainless steel plate to a desired thickness and dried with hot air at 140° C. for 5 minutes. Then, the resulting film was peeled away from the stainless steel plate, followed by heating at 390° C. for 3 minutes to obtain a polyimide copolymer film.

EXAMPLE 2

In Example 1, the amounts of (A) component and (B) component were changed to 10.91 g (0.05 moles) and 16.11 g (0.05 moles), respectively, and 349.5 g of polyamic acid solution (solid concentration: 15 wt. %; viscosity at 20° C.: 6,950 cps) was obtained. A polyimide copolymer film was formed therefrom in the same manner as in Example 1.

EXAMPLE 3

In Example 1, the amounts of (A) component and (B) component were changed to 15.27 g (0.07 moles) and 9.67 g (0.03 moles), respectively, and 347.4 g of polyamic acid solution (solid concentration: 15 wt. %; viscosity at 20° C.: 6,830 cps) was obtained. A polyimide copolymer film was formed therefrom in the same manner as in Example 1.

COMPARATIVE EXAMPLE 1

In Example 1, no (B) component was used, but the amount of (A) component was changed to 21.81 g (0.1 mole), and 344.2 g of polyamic acid solution (solid concentration: 15 wt. %; viscosity at 20° C.: 5,200 cps) was obtained. It was tried to form a polyimide copolymer film in the same manner as in Example 1, but no film was formed.

COMPARATIVE EXAMPLE 2

In Example 1, 20.80 g (0.04 moles) of (A') isopropylidenebis(4-phenyleneoxy-4-phthalic acid) dianhydride was used in place of (A) component, and the amount of (B) component was changed to 19.32 g (0.06 moles). 362.5 g of polyamic acid solution (solid concentration: 15 wt. %; viscosity at 20° C.: 4,800 cps) was obtained. A polyimide copolymer film was formed therefrom in the same manner as in Example 1.

COMPARATIVE EXAMPLE 3

In Comparative Example 2, the amounts of (A') component and (B) component were changed to 10.40 g (0.02 moles) and 25.76 g (0.08 moles), respectively, and 358.5 g of polyamic acid solution (solid concentration: 15 wt. %; viscosity at 20° C.: 4,280 cps) was obtained. A polyimide copolymer film was formed therefrom in the same manner as in Example 1.

COMPARATIVE EXAMPLE 4

In Comparative Example 2, the amounts of (A') component and (B) component were changed to 5.20 g (0.01 mole) and 29.00 g (0.09 moles), respectively, and 356.6 g of polyamic acid solution (solid concentration: 15 wt. %; viscosity at 20° C.: 5,200 cps) was obtained. A polyimide copolymer film was formed therefrom in the same manner as in Example 1.

The polyimide copolymer films obtained in the foregoing Examples 1 to 3 and Comparative Example 2 to 4 were tested to determine coefficients of thermal linear expansion (samples used: stress-relaxed samples obtained by heating, tester: TMA tester, stretching mode: 2 g load, sample length: 20 mm, heating rate: 10° C./min., and test temperatures: 100°–200° C.); tensile strength (according to ASTM D882-82); elongation at breaking (according to ASTM D882-83); and glass transition temperature Tg (by determining a loss modulus E" in Pa as a unit from a dynamic viscoelasticity as measured by Perkin-Elmer dynamic viscoelasticity analyzer DMe 7e and presuming Tg from the maximum E"). The results are shown in the following Table together with film thickness.

TABLE

| Test item | Ex. 1 | Ex. 2 | Ex. 3 | Comp. Ex. 2 | Comp. Ex. 3 | Comp. Ex. 4 |
|---|---|---|---|---|---|---|
| Film thickness (mm) | 21 | 19 | 20 | 12 | 12 | 12 |
| Coefficient of thermal linear expansion (ppm/° C.) | 18 | 7.7 | 3.6 | 30 | 28 | 24 |
| Tensile strength (MPa) | 246 | 270 | 260 | 145 | 173 | 202 |
| Elongation at breaking (%) | 51 | 43 | 27 | 65 | 20 | 32 |
| Glass transition temp. Tg (° C.) | 375 | 404 | 450 | 310 | 324 | 333 |

What is claimed is:

1. A film-formable polyimide copolymer, which comprises two kinds of tetracarboxylic acid dianhydrides, consisting of (A) pyromellitic acid dianhydride and (B) 3,3',4,4'-benzophenonetetracarboxylic acid dianhydride, and (C) 6-amino-2-(p-aminophenyl)benzimidazole.

2. A film-formable polyimide copolymer according to claim 1, where the two kinds of tetracarboxylic acid dianhydrides are in a proportion of 5–90 mol. % of (A) component to 95–10 mol. % of (B) component, sum total being 100 mol. %.

3. A film-formable polyimide copolymer according to claim 1, wherein the two kinds of tetracarboxylic acid dianhydrides are in a proportion of 10–80 mol. % of (A) component to 90–20 mol. % of (B) component, sum total being 100 mol. %.

4. A film formed from a film-formable polyimide copolymer, which comprises two kinds of tetracarboxylic acid anhydrides, consisting of (A) pyromellitic acid anhydride and (B) 3,3',4,4'-benzophenonetetracarboxylic acid dianhydride, and (C) 6-amino-2-(p-aminophenyl) benzimidazole.

5. A process for forming a polyimide copolymer film, which comprises allowing two kinds of tetracarboxylic acid dianhydrides consisting of (A) pyromellitic acid dianhydride and (B) 3,3',4,4'-benzophenonetetracarboxylic acid dianhydride to react with (C) 6-amino-2-(p-aminophenyl)-benzimidazole, casting the resulting polyamic acid solution onto a substrate, drying the cast solution, peeling the resulting film away from the substrate, and heating the polyamic acid film at a polyimidization temperature.

* * * * *